United States Patent [19]
Mack

[11] Patent Number: 6,070,884
[45] Date of Patent: Jun. 6, 2000

[54] DRILL CHUCK

[75] Inventor: Hans-Dieter Mack, Sontheim, Germany

[73] Assignee: Rohm GmbH, Sontheim, Germany

[21] Appl. No.: 09/239,169

[22] Filed: Jan. 28, 1999

[30] Foreign Application Priority Data

Feb. 7, 1998 [DE] Germany ............................ 198 05 019

[51] Int. Cl.[7] .................................................. B23B 31/12
[52] U.S. Cl. ............................................. 279/62; 279/902
[58] Field of Search ............................... 279/60–65, 902; 408/240

[56] References Cited

U.S. PATENT DOCUMENTS

| | | | |
|---|---|---|---|
| 2,075,031 | 3/1937 | Emrick | 279/63 |
| 3,948,534 | 4/1976 | Schnizler, Jr. et al. | 279/62 |
| 4,775,159 | 10/1988 | Manschitz | 279/62 |
| 5,913,524 | 6/1999 | Barton | 279/62 |

*Primary Examiner*—Steven C. Bishop
*Attorney, Agent, or Firm*—Herbert Dubno; Andrew Wilford

[57] ABSTRACT

A drill chuck has a chuck body rotatable about a chuck axis and formed with a plurality of axially forwardly open and angled guide passages and with a radially outwardly open groove, respective jaws slidable in the passages and each having a row of radially directed teeth and an axially backwardly directed face, and a ring received in the groove and rotatable about the axis relative to the chuck. The ring is formed with a screwthread meshing with the jaw teeth so that rotation of the ring in one direction moves the jaws axially forward and radially together and opposite rotation moves the jaws axially backward and radially apart. In accordance with the invention a spring is operatively engaged between the chuck body and the ring and compressible on axial backward movement of the jaws into an extreme rear position for cushioning the backward movement of the jaws into the extreme rear position.

13 Claims, 5 Drawing Sheets

DRILL CHUCK

FIELD OF THE INVENTION

The present invention relates to a chuck. More particularly this invention concerns a chuck for a power drill.

BACKGROUND OF THE INVENTION

A standard drill chuck has a chuck body rotatable about a chuck axis and formed with a plurality of axially forwardly open and angled guide passages and with a radially outwardly open groove, respective jaws slidable in the passages and each having a row of radially directed teeth and an axially backwardly directed face, and a ring received in the groove and rotatable about the axis relative to the chuck. The ring is formed with a screwthread meshing with the jaw teeth so that rotation of the ring in one direction moves the jaws axially forward and radially together and opposite rotation moves the jaws axially backward and radially apart.

The problem with such a structure is that when the jaws are moved into an extreme rear position they can wedge tightly against the ring and make it very difficult, when they need to be advanced again, to dislodge them. This is particularly likely to happen in a keyless power drill where the standard procedure is to grip an adjustment sleeve mounted on the ring and operate the drill in the appropriate direction to retract the jaws, as in this case the chuck body is rotating relative to the ring at a high rate of speed so that the above-described wedging action is particularly great.

OBJECTS OF THE INVENTION

It is therefore an object of the present invention to provide an improved drill chuck.

Another object is the provision of such an improved drill chuck which overcomes the above-given disadvantages, that is which avoids the possibility of the jaws wedging against the ring or chuck body when they are retracted.

SUMMARY OF THE INVENTION

A drill chuck has according to the invention a chuck body rotatable about a chuck axis and formed with a plurality of axially forwardly open and angled guide passages and with a radially outwardly open groove, respective jaws slidable in the passages and each having a row of radially directed teeth and an axially backwardly directed face, and a ring received in the groove and rotatable about the axis relative to the chuck. The ring is formed with a screwthread meshing with the jaw teeth so that rotation of the ring in one direction moves the jaws axially forward and radially together and opposite rotation moves the jaws axially backward and radially apart. In accordance with the invention a spring is operatively engaged between the chuck body and the ring and compressible on axial backward movement of the jaws into an extreme rear position for cushioning the backward movement of the jaws into the extreme rear position.

Thus when the jaws are rapidly retracted they will not all of a sudden bottom on a hard surface, but instead they will be softly braked to a stop, coming to a gentle rest. In this manner they will not become jammed or be likely to actually bite into the ring, making it easy to reverse and move them forward.

According to the invention the spring is an elastically deformable sleeve braced between the chuck body and the ring. This sleeve is generally of W-section and has an inner collar braced against the chuck body and an outer collar operatively braced against the ring. The outer collar has a radially extending lip operatively braced against the ring and the sleeve has a bight portion that is axially forwardly convex. This lip can bear via the bearing on the tightening ring, thereby eliminating the need for a separate part to anchor this bearing.

The ring in accordance with the invention is a radially projecting and elastically deformable lip directly engageable with the jaw faces and constituting the spring. It can be unitarily formed with the ring. Alternately, the spring is an elastically deformable washer bearing axially backward against the ring and directly engageable with the jaw faces. The ring has an axially forwardly directed face formed with a bevel normally spaced from a rear face of the washer. This washer can be welded or glued to the ring. With this arrangement a single spring element—the washer—is effective on all the jaws, greatly simplifying construction. When the ring and washer are split, as is necessary to fit them into the groove of the one-piece chuck body, no additional means is necessary to hold the washer in place since it is only really exposed at the guide passages.

In another embodiment according to the invention the washer is of L-section with a planar leg lying on the ring face and a cylindrical leg. The ring in this case is formed with a groove receiving the cylindrical leg. When the ring and washer are split the ring is formed with a split bore and the washer has end tabs received in the split bore.

BRIEF DESCRIPTION OF THE DRAWING

The above and other objects, features, and advantages will become more readily apparent from the following description, reference being made to the accompanying drawing in which:

FIGS. 5 and 6 are views like FIG. 3 of further variations on the inventive chuck;

SPECIFIC DESCRIPTION

Figure 1:
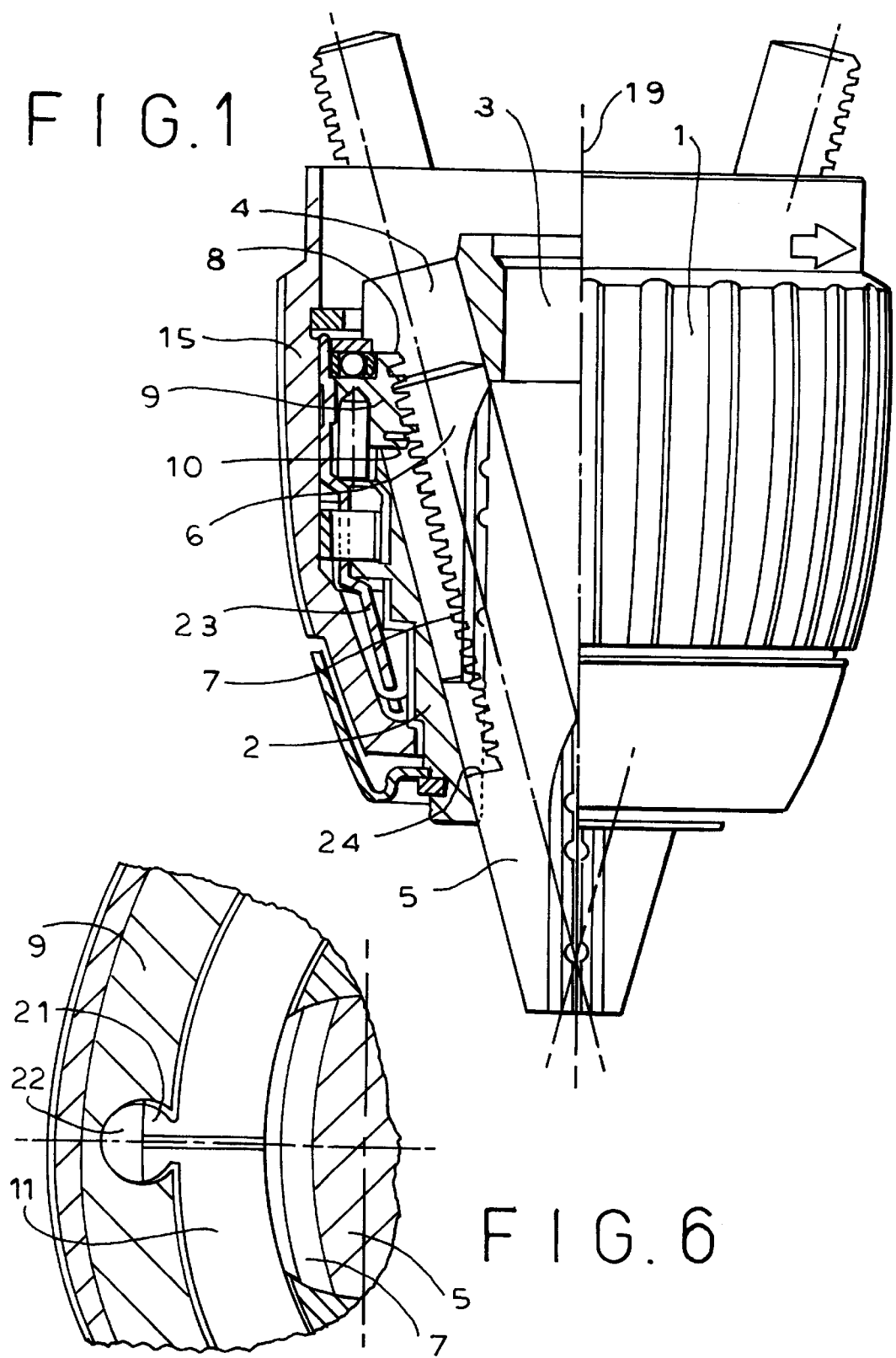
FIG. 1 is a side view partly in axial section through a chuck according to the invention.

As seen in the drawing, a chuck 1 according to the invention basically has a body 2 formed centered on an axis 19 with a rearwardly open threaded spindle hole 3 normally fitted to a spindle 17 (FIG. 5) of a power drill 18 The body 2 is formed with three angled guide passages 4 each receiving a respective steel jaw 5 having a rearwardly projecting shank 6 formed with teeth 7 meshing with an internal screwthread of a ring 9 set in a radially outwardly open groove 8 formed in the body 2. An outer tightening sleeve 15 is coupled by means of a coupling sleeve 23 to the ring 9 so that rotation of this sleeve 15 relative to the chuck body 2 in one direction will move the jaws 5 axially forward and radially together to grip a tool and opposite rotation will move them backward and radially apart. This is all generally standard construction as describe in commonly owned patent applications 08/606,996 and 09/092,783.

In the embodiment of FIG. 1 the ring 9 is formed with a spring member constituted as a radially inwardly projecting and elastically deformable lip 10 that is engageable with rearwardly directed surfaces 24 defined by shoulders formed on the jaws 5. Thus as the jaws 5 are retracted backward by appropriate rotation of this ring 9, their rearwardly directed faces 24 will come into contact with this lip 10 and elastically deform it axially backward. This will cushion the backward movement of the jaws 5 so that they will come to a gentle stop, unlike in the prior art where they come suddenly into engagement with an unmoving surface against which they can wedge. Furthermore once the rearward travel of the jaws 5 stops, the spring action will in effect move them slightly forward again, making them free enough so that they can easily be advanced again without sticking.

Figure 2:
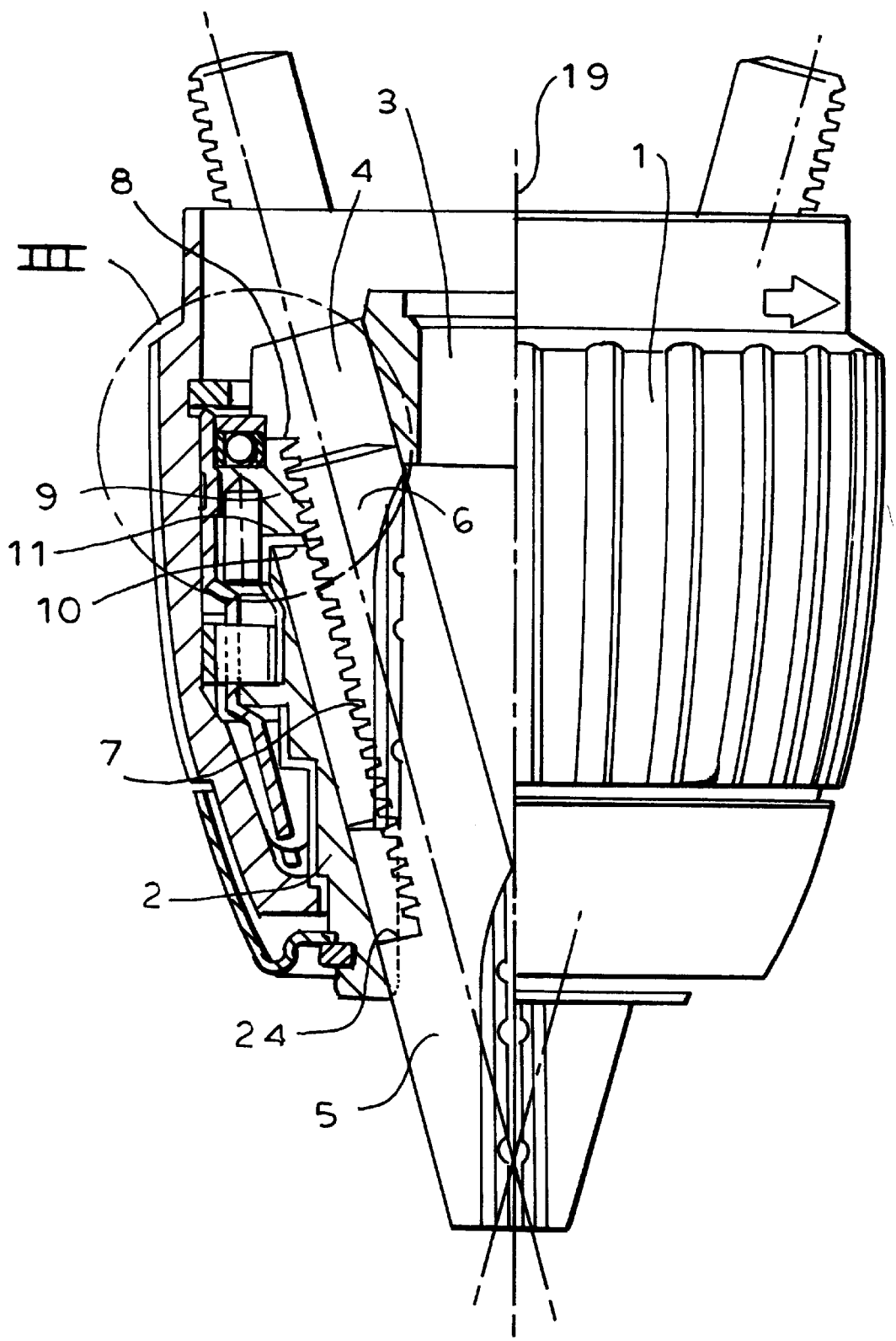
FIG. 2 is a view like FIG. 1 of another chuck in accordance with the invention.
Figure 3:
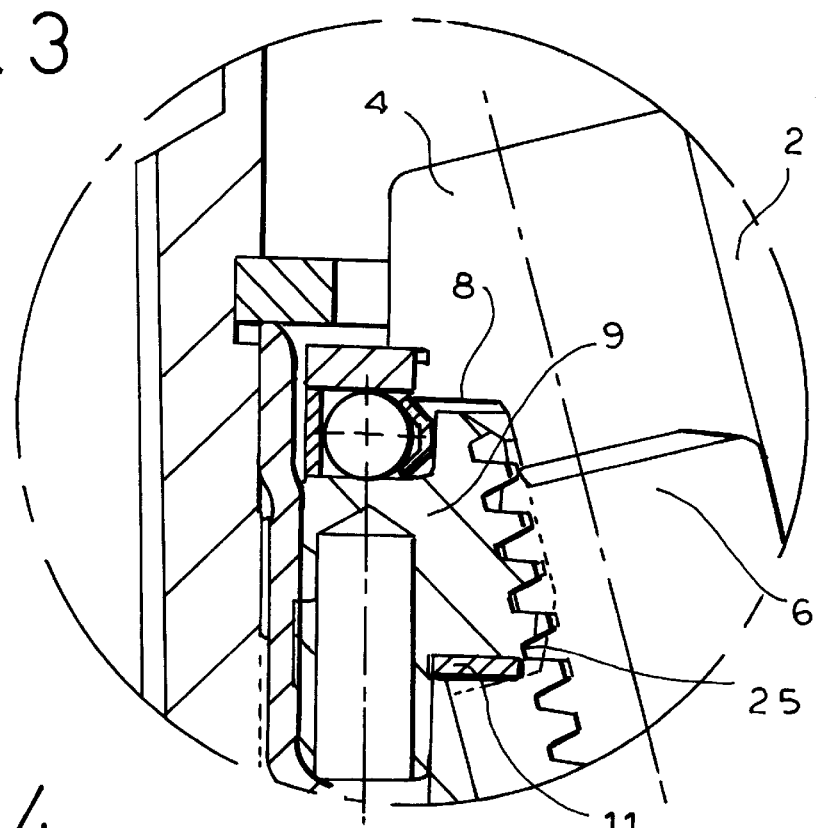
FIG. 3 is a large-scale view of the detail indicated at III in FIG. 2.

In the system shown in FIGS. 2 and 3, the spring member is formed by a flat spring-steel washer 11 that sits against a front face of the ring 9 that is formed with a 30° bevel 25. Thus, as the jaws 5 move back, their faces 24 will engage the inner periphery of this washer 11 and elastically deform it axially backward, thereby bringing the jaws 5 to a gentle stop.

Figure 4:
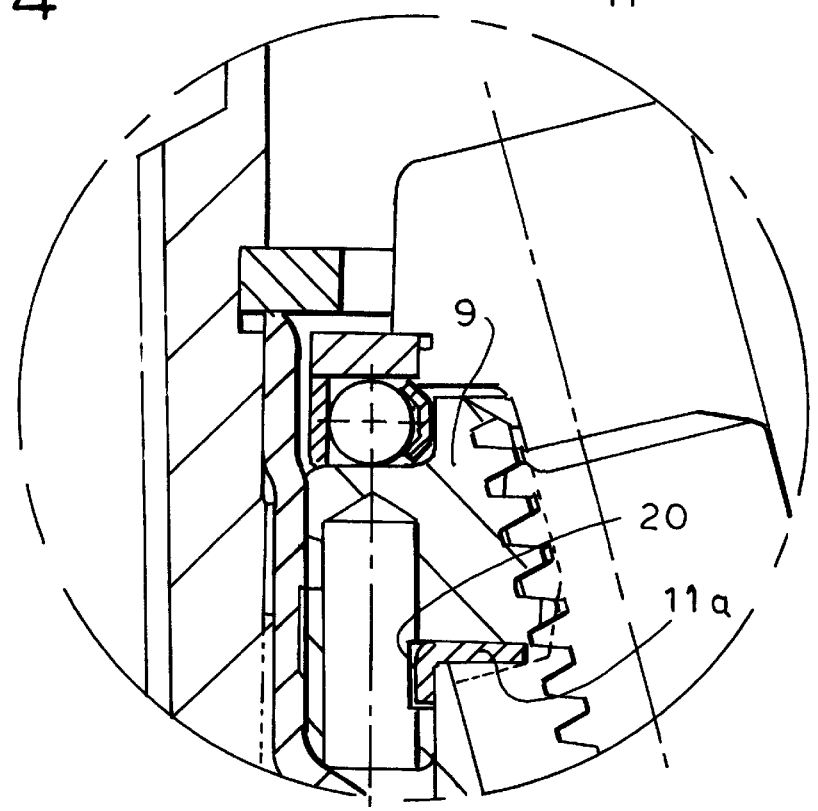
FIG. 4 is a view like FIG. 3 of a variation on the chuck according to the invention.
Figure 5:
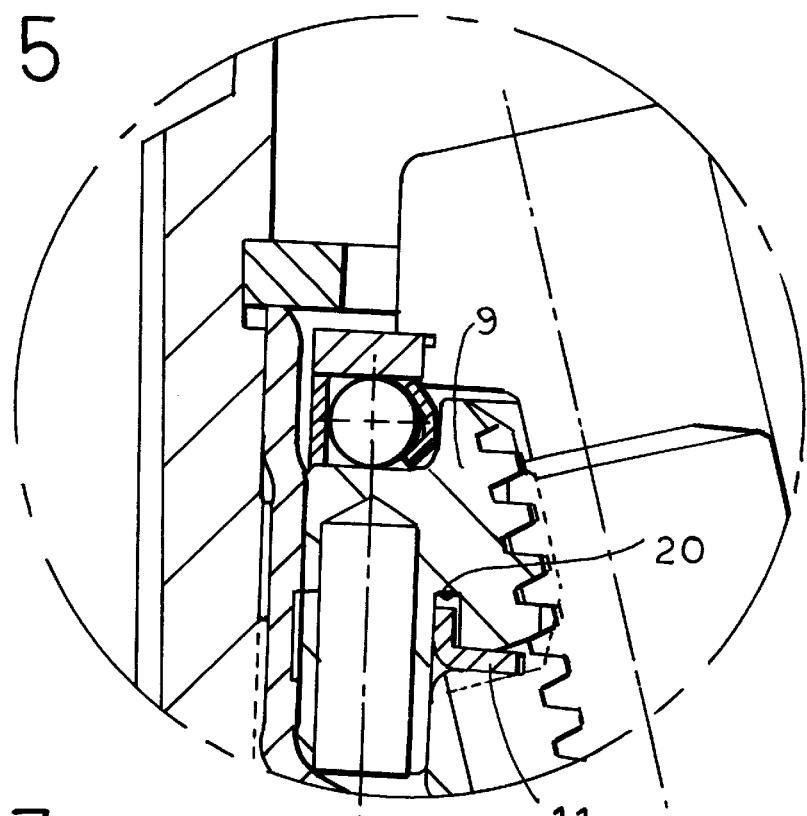

FIGS. 4 and 5 show L-shaped washers 11a and 11b having axially extending outer flanges received in respective forwardly and rearwardly extending grooves 20a and 20b formed in the ring 9.

Figure 7:
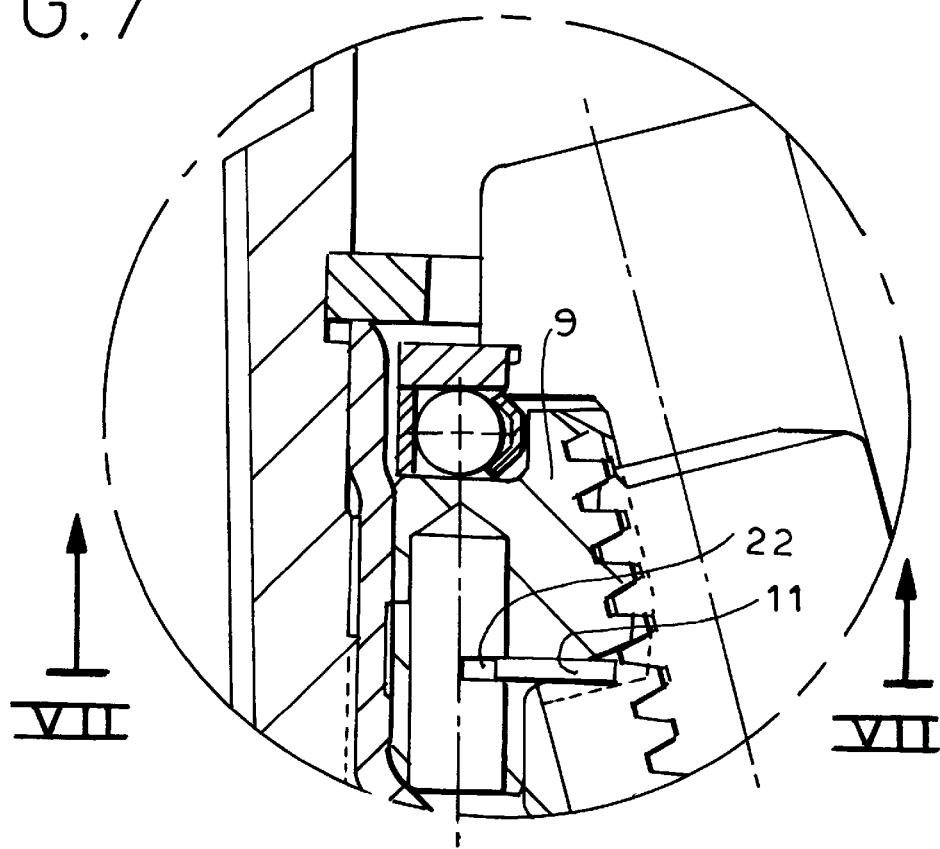
FIG. 7 is a section taken along line VII—VII of FIG. 6.

In FIGS. 6 and 7 a ring 11c is made of two semicircular pieces having end lugs 21 captured in a groove 22 formed in the ring 9, which also may be made of two pieces. This ring 11c is a flat washer as in FIGS. 2 and 3. This construction allows the ring 11c to be fitted around the one-piece chuck body 2.

Figure 8:
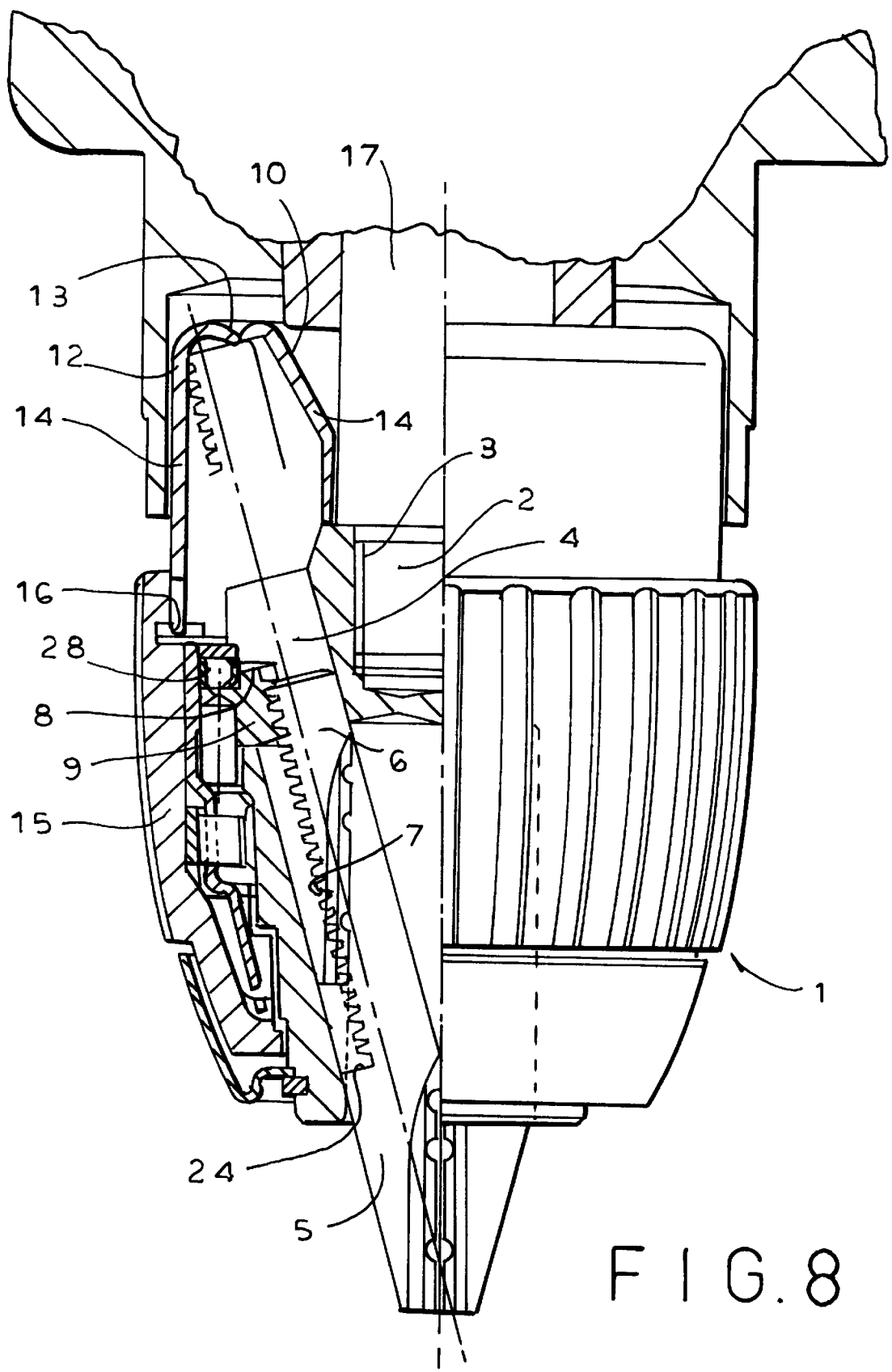
FIG. 8 is a view like FIG. 1 of yet another chuck in accordance with the invention.

The system of FIG. 8 is substantially different in that it uses a spring member constituted as a W-section elastically deformable sheet-metal sleeve 12 having inner and outer collars respectively bearing axially forward on the chuck body 2 and on the ring 9. The outer collar 14 has a front end 16 bearing via a bearing 26 on the ring 9. Thus as the ring 9 is pushed back when the jaw faces 24 engage it at the end of their rearward travel, this sleeve 12 will deform at its rear bight portion 13, allowing some rearward movement of the ring 9 to cushion the jaws 5.

I claim:

1. A drill chuck comprising:
    a chuck body rotatable about a chuck axis and formed with a plurality of axially forwardly open and angled guide passages and with a radially outwardly open groove;
    respective jaws slidable in the passages and each having a row of radially directed teeth and an axially backwardly directed face;
    a ring received in the groove and rotatable about the axis relative to the chuck, the ring being formed with a screw-thread meshing with the jaw teeth, whereby rotation of the ring in one direction moves the jaws axially forward and radially together and opposite rotation moves the jaws axially backward and radially apart; and
    spring means operatively engaged between the chuck body and the ring and compressible on axial backward movement of the jaws into an extreme rear position for cushioning the backward movement of the jaws into the extreme rear position.

2. The drill chuck defined in claim 1 wherein the spring means is an elastically deformable sleeve braced between the chuck body and the ring.

3. The drill chuck defined in claim 2 wherein the sleeve is generally of W-section and has an inner collar braced against the chuck body and an outer collar operatively braced against the ring.

4. The drill chuck defined in claim 3 wherein the outer collar has a radially extending lip operatively braced against the ring.

5. The drill chuck defined in claim 3 wherein the sleeve has a bight portion that is axially forwardly convex.

6. The drill chuck defined in claim 1 wherein the ring is a radially projecting and elastically deformable lip directly engageable with the jaw faces and constituting the spring means.

7. The drill chuck defined in claim 6 wherein the lip is unitarily formed with the ring.

8. The drill chuck defined in claim 1 wherein the spring means is an elastically deformable washer bearing axially backward against the ring and directly engageable with the jaw faces.

9. The drill chuck defined in claim 8 wherein the ring has an axially forwardly directed face formed with a bevel normally spaced from a rear face of the washer.

10. The drill chuck defined in claim 9 wherein the washer is of L-section with a planar leg lying on the ring face and a cylindrical leg, the ring being formed with a groove receiving the cylindrical leg.

11. The drill chuck defined in claim 8 wherein the ring and washer are split.

12. The drill chuck defined in claim 11 wherein the ring is formed with a split bore and the washer has end tabs received in the split bore.

13. The drill chuck defined in claim 8 wherein the washer is made of spring steel.

\* \* \* \* \*